Jan. 3, 1956  M. C. BRADY  2,729,730
PRESSURE GAUGE
Filed Nov. 2, 1950
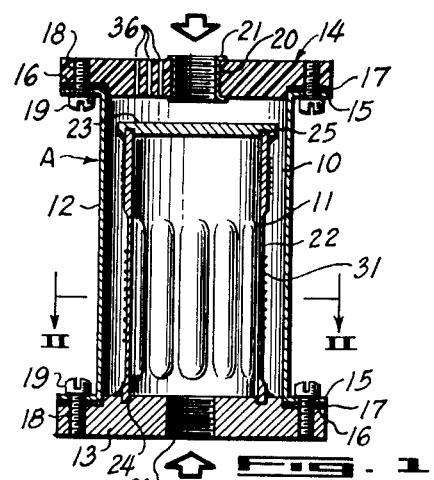
FIG. 1
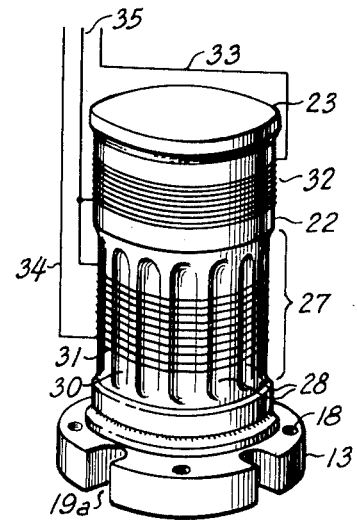
FIG. 3
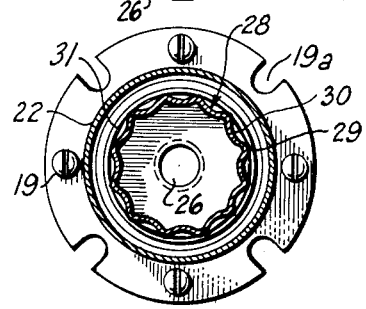
FIG. 2
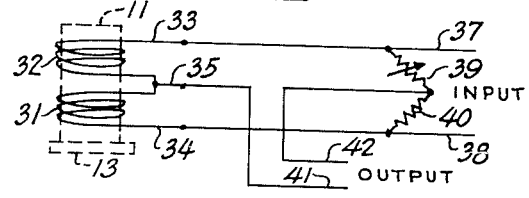
FIG. 4
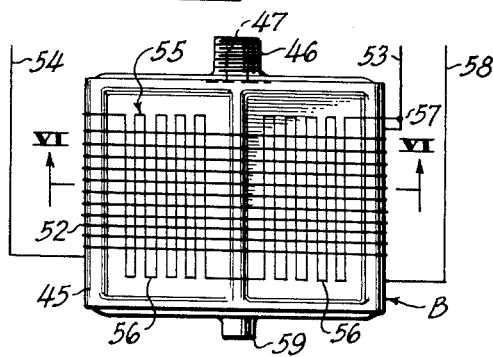
FIG. 5
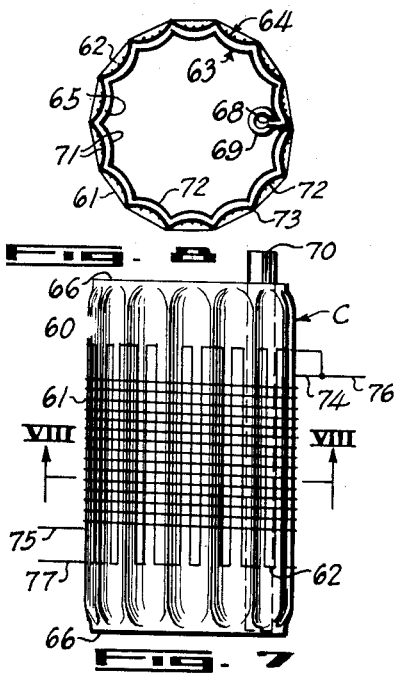
FIG. 8
FIG. 7
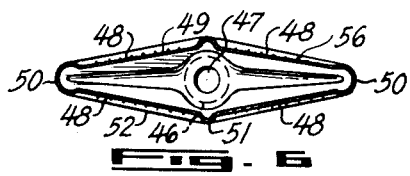
FIG. 6
INVENTOR.
Merle C. Brady
BY
ATTORNEY

United States Patent Office 2,729,730
Patented Jan. 3, 1956

2,729,730

PRESSURE GAUGE

Merle C. Brady, San Diego, Calif., assignor, by mesne assignments, to General Dynamics Corporation, a corporation of Delaware Application November 2, 1950, Serial No. 193,680

11 Claims. (Cl. 201—63)

The invention relates to gauges for measuring, indicating, or recording static or dynamic fluid pressures.

The principal object of the invention is to provide an improved pressure gauge of the type in which strain-sensitive resistance wires are supported on a pressure chamber to respond to deformation of the chamber caused by ambient pressure differentials, to vary the current in an electrical circuit. An example of this general type of gauge is described in U. S. #2,365,015 to E. E. Simmons, Jr. In this type of pressure gauge, the fluid pressure to be measured is transmitted to the interior of a generally cylindrical closed chamber, and the strain induced in the wall of the latter is measured by a strain-sensitive resistance wire continuously bonded to the outside surface thereof. The principal difficulty of this type of gauge resides in the fact that while the chamber must be designed to withstand the pressures to which it is subjected, it must be sufficiently thin so that the strain induced in the material of its walls is sufficient to permit significant measurement by means of the strain-sensitive wire. For this reason gauges of this type are impractical in the measurement of pressures below 200 p. s. i. In distinction to this type of gauge, the present invention employs a relatively compliant pressure chamber having a non-circular cross-section and provided with inwardly extending elements such as flutes or corrugations, the strain-responsive coil being supported only upon the radial projections thereof. Thus, the perimeter of the chamber is greater than a circumscribing line in a radial plane, and a direct strain is induced in the strain-responsive resistance wire surrounding the chamber as a result of pressure fluctuations, which is greater than the strain induced in the walls of the chamber itself. By this means, the response of the coil is primarily a function of the configuration of the supporting chamber rather than of its wall thickness.

Gauges of the type under consideration have a wide range of usefulness in indicating, measuring, or recording pressure fluctuations, as for example in determining the aerodynamic characteristics of aircraft components. Available pressure gauges for purposes such as this, are unsatisfactory because they are mechanically resonant in the frequency ranges of vibration of the structures from which they must be supported. Further, it is desirable that gauges for these purposes be small, light, and compact. The construction of the pressure gauge contemplated by the present invention is well suited to these requirements. Since the response of the gauge is not a function of the wall thickness of the pressure chamber the latter may be selected to provide resonant frequencies beyond the frequencies encountered in use, and since a non-circular section is used, the design offers a wide variety of shapes and sizes to meet exacting space requirements.

An object of the invention therefore, is to provide an improved pressure gauge of the type in which strain-sensitive resistance wire is supported on a pressure chamber for measuring the differential pressure between the fluid surrounding the chamber and that within it.

A further object of the invention is to provide a pressure gauge of the type under consideration in which the response in the strain-sensitive coil is a function of the cross-sectional configuration of the pressure chamber on which it is supported rather than to its wall thickness.

Still another object is to provide a pressure gauge in which the strain-responsive coil is supported upon and circumscribes a compliant pressure chamber having a perimeter that is greater than a line circumscribing it in a radial plane.

Still another object of the invention is to provide a pressure gauge of this general type wherein the pressure measurements are compensated for thermal variations.

Another object of the invention is to provide an improved pressure gauge which is small, free of moving parts, compact, and insensitive to the ambient vibrational frequencies of the structure to which it is connected or attached.

Still another object of the invention is to provide an improved pressure gauge which is inexpensive to manufacture and simple to maintain and repair.

Other objects of the invention will appear from the detailed description.

The invention consists of the several novel features hereinafter set forth and more particularly defined by claims at the conclusion hereof.

In the drawing:

Fig. 1 is a vertical section of a pressure gauge embodying the invention.

Fig. 2 is a section on line II—II of Fig. 1.

Fig. 3 is a perspective of one of the gauges with the external pressure chamber removed to illustrate the configuration of the inner pressure chamber and the disposition of the strain-sensitive elements.

Fig. 4 is a diagrammatic view of a typical circuit for measuring pressures by means of a pressure gauge embodying the present invention.

Fig. 5 is a side elevation of a modified form of the invention.

Fig. 6 is a section on line VI—VI of Fig. 5.

Fig. 7 is a side view illustrating the invention in connection with a modified pressure chamber on which the strain-resistant wire is supported.

Fig. 8 is a section on line VIII—VIII of the modified form of the invention shown in Fig. 7.

The preferred embodiment of the present invention, as exemplified in Figs. 1, 2, and 3 is in the form of a pressure gauge A adapted to measure differential pressures or pressure fluctuations between two fluids. The gauge A generally comprises an outer pressure chamber 10, and a spaced inner pressure chamber 11. The outer pressure chamber 10 is formed by a shell or housing 12 supported between a pair of end plates 13 and 14.

The shell 12 may be of any convenient cross-sectional shape, but is cylindrical as shown and is provided at each end with a circumferential, radially extending flange 15. The end plates 13 and 14 are recessed at 16 on their opposed faces to accommodate sealing washers 17 and the flanges 15. A series of threaded holes 18 are provided in each of the end plates 13 and 14 corresponding to mating holes through the sealing washers 17 and the flanges 15 to accommodate spaced machine screws 19 so that when assembled the end plates 13 and 14 and the shell 12 form the closed and sealed outer pressure chamber 10. A series of radial recesses or slots 19a may be provided around the periphery of the end plates 13 and 14 and through the mating flanges 15 and washers 17 as a means for fastening the gauge A by suitable bolts or clamps to supporting structure in its desired position. The upper end plate 14 is formed of an electrical insulating material such as formica or Bakelite and is provided with a central bore 20 communicating with the interior of the outer pressure chamber 10, and in which is secured an internally threaded bushing 21 adapted to accommodate a pipe or tube fitting through which one of the fluids to be measured is connected.

The inner pressure chamber 11 is spaced from the outer chamber 10 at its sides and upper end, and is formed by a hollow, tubular inner shell 22 closed at its upper end by an end cap 23. The lower end of the shell 22 is supported in a recess or groove 24 in the upper face of the end plate 13 and is secured thereto by welding or brazing to form a leak-proof joint. The end cap 23 is provided with a recess or groove 25 which accommodates the upper end of the shell 22 and is circumferentially welded or brazed thereto to form a sealed upper closure.

A threaded central port 26 through the end plate 13 communicates with the interior of the inner pressure chamber 11 and is adapted to accommodate a pipe or tube fitting for conducting the second of the fluids to be measured within the inner chamber 11.

The shell 22 is formed of tubing of sufficient wall thickness to withstand the stresses resulting from the fluid pressure differentials for which the gauge is to be used without appreciable deformation. For a portion of its length, the shell 22 is reduced in wall thickness to form a relieved portion 27. The relieved portion 27 is provided with a series of longitudinal and contiguous corrugations or flutes 28, and the joining edges 29 of the flutes lie in the general outer plane of the shell 22 and are joined by inwardly directed concave portions 30.

Strain-sensitive resistance wire is wound around and supported on the outer surface of the shell 22 to form a pressure indicating coil 31 and a thermal compensating coil 32 connected in series. The pressure indicating coil 31 consists of a number of turns of the strain-sensitive resistance wire wound around and circumscribing the relieved portion 27 and supported in spaced relation from each other upon the edges 29. The thermal compensating coil 32 consists of a number of turns of the wire secured in spaced relation over the upper cylindrical end of the shell 22. The lengths of wire forming the two coils 31 and 32 are approximately equal. The free ends 33 and 34 of the coils 31 and 32 and a connector 35 connected to a tap between the coils are led out from the outer chamber 10 through spaced holes 36 in the upper end cap 14 and in which they are sealed.

While insulated wire may be used in forming the coils 31 and 32, it is somewhat more convenient and less expensive to employ bare wire and to form the inner shell 22 of aluminum either anodized or porcelainized to prevent electrical contact between the elements of the coils. It is also satisfactory to use porcelainized steel or beryllium copper for this purpose.

From the description thus far given, it will be apparent that a pressure differential existing between the fluid inside the shell 22 and that surrounding it in the outer pressure chamber 10, will tend to deform the fluted and relieved portion 27 imparting a direct stress in the wire forming the coil 31. The ends of the latter are secured to the shell 22 so that the tendency of the relieved portion 27 to deform under pressure differentials is directly resisted by the wire in the coil 31.

Since the turns of wire forming the coil 31 are supported only on the projections 29, differential pressures applied to the wall of the relieved portion 27 tend to expand or contract it resulting in an amplified or decreased stress in each element of the wire freely stretched from one of the projections 29 to the adjacent one. The strain induced in the wire forming the coil 31 is therefore not proportional to the strain set up in the walls of the relieved portion 27, but is increased therefrom and is directly induced by the action of the pressure differential existing on the non-circular portion of the shell 22. The inner shell therefore serves as a compliant and semi-flexible envelope to separate the two fluids under measurement, its distortion due to ambient pressure differentials being directly resisted by the strain-sensitive wire of the coil 31.

Since the response in the coil 31 results from the cross-sectional configuration of the relieved portion 27, rather than from the stresses induced in the material itself, the wall thickness of the shell 22 in the area of the relieved portion 27 may be increased over that required in similar gauges wherein the actual wall stresses are depended upon for measurement. By this means, the stiffness of the gauge may be increased, raising the resonant characteristics of the gauge to frequency ranges not ordinarily encountered. The coil 31 has a high natural frequency by reason of the relatively short distance between its points of support.

In the preferred form the wire forming the coil 31 is secured only to the shell 22 at its extremities. If desired, the wire may be bonded intermittently at the points of support on the edges or projections 29, or slight indentations may be formed in axial spaced relation thereon, to guide the wire and maintain the turns of the coil from contact. In order to permit use of the gauge A where the fluid pressure in the outer chamber 10 exceeds that within the inner chamber 11, resulting in a tendency to contract the shell 22, the wire of the coils 31 and 32 may be pre-loaded in winding so that the reduction of strain in the coil resulting from the above condition may be measured.

The electrical resistance of the wire forming the coil 31 varies with the induced stress, and in addition is affected by temperature. The function of the coil 32 is to compensate for and eliminate the effect of temperature changes on the coil 31 resulting from the ambient temperatures of the fluids contacting the inner pressure chamber 11.

The thickness of the portion of the shell 22 on which the coil 32 is supported is sufficient so that the strain response of the coil 32 is negligible in comparison with that of the coil 31. The coils are electrically connected as will be described, so that the temperature effect on the pressure-responsive coil 31 is offset and balanced by that of the compensating coil 32. It is immaterial whether the wire forming the coil 32 is continuously bonded to the outer wall of the shell, or not. By pre-stressing the wire, its strain is varied in relation to the change in circumference of the section on which it is wound.

Fig. 4 is a schematic wiring diagram illustrating a half Wheatstone bridge circuit for utilizing the gauge A to measure fluid pressures. The input current is supplied to the ends 33 and 34 of the series connected coils 31 and 32 through connectors 37 and 38. A variable resistor 39 and a fixed resistor 40 are connected in series across the input connectors 37 and 38. The output signals from the gauge A are transmitted to a galvanometer, oscillograph or other suitable measuring or recording instrument through a connector 41 from the center connector 35 of the gauge A, and a wire 42 connected to the circuit between the variable resistor 39 and the fixed resistance 40. Since the current flowing in the pressure indicating coil 31 is opposed to that in the temperature compensating coil 32, the resistance of the latter may be balanced against the resistance of the former by means of the variable resistor 39, and thereafter resistance variation in the coil 31 due to ambient thermal changes will be compensated automatically by an equivalent change in the resistance of the coil 32, so that only the net change in resistance in the coil 31 resulting from stress variations in the coil 31 are indicated by the current flowing through the output leads 41 and 42. Since the coils 31 and 32 are closed and opposed there is little if any appreciable inductive effect.

It will be obvious to those skilled in the art that a full Wheatstone bridge circuit may be alternatively employed in connection with the gauge A which provides twice the output from the gauge for a given voltage input.

While the inner pressure chamber 11 is generally cylindrical in the form of the invention illustrated in Figs. 1, 2, and 3, for some purposes, as for example where it is desired to employ a number of gauges in side-by-side relationships within a restricted area, the embodiment shown in Figs. 5 and 6 may be preferable. In this form, the gauge B consists of a single sealed chamber 45 having an externally threaded projection 46 at one end through which a hole 47 communicates with the hollow interior. The projection 46 is adapted to connect by a suitable pipe or tube coupling a conduit through which the fluid having the pressure to be measured is conducted. The gauge may be mounted in any enclosed area subjected to a second fluid pressure, or without such enclosure, is subjected to atmospheric pressure in which case, the gauge is adapted to indicate the differential pressure between the fluid conducted to the interior of the chamber 45 and the ambient atmospheric pressure.

The chamber 45 is generally diamond-shaped in cross-section, each of the four sides 48 forming the diamond, being provided with a rectangular inwardly depressed portion 49.

Rounded edges 50 are thus formed at the extremities of the major axis of the diamond and edges 51 at the extremities of the minor axis. The outer surfaces of the edges 50 and 51 are outwardly separated from the planes of the depressed portions 48 and the perimeter of the chamber 45 is greater than line circumscribing it in a lateral plane.

A pressure indicating coil 52 circumscribes and is supported on the chamber 45 consisting of a number of turns of strain-resistant wire axially spaced over the edges 49 and 50, the ends of the coil 51 terminating in the leads 53 and 54. The ends of the pressure indicating coil 52 are secured as by cementing to the outer surface of the chamber 45. The individual windings may be similarly secured at their points of support on the edges 50 and 51 if so desired, but this is not essential.

The gauge B is provided with a temperature-compensating coil 55 comprising a grid formed of resistance wire, having four series-connected sections 56 each being secured to one of the depressed portions 49 as by cementing. The convolutions of the coil 55 are generally parallel to the axis of the chamber 45, so that circumferential expansion or contraction of the latter does not induce strains in the wire forming the coil 55. One end of the temperature-compensating coil 55 is connected to the lead 53 of the pressure indicating coil at 57, and the other forms a lead 58.

The pressure chamber 45 of the gauge B is preferably formed of aluminum, and if bare wire is employed for the coils 52 and 55, the windings may be insulated from the chamber 45 and from each other by anodizing or porcelainizing the outer surface of the chamber 45. Other light, semi-flexible, and imperivous materials such as impregnated fibreglas are suitable for forming the chamber 45.

A boss or projection 59 may be provided on one end of the gauge B to support or locate it in desired position when in use.

In utilizing the gauge B to indicate, measure or record pressures, it may be electrically connected as shown in Fig. 4 in connection with the gauge A, or as one arm of a full Wheatstone bridge circuit. Connected as schematically illustrated in Fig. 4, the input voltage is connected through the connectors 37 and 38 to the leads 54 and 58 of the series connected coils 52 and 55. The output from the gauge B is taken through the leads 41, connected to the center lead 53 of the gauge B, and 42, connected to the circuit between the variable resistor 39 and the fixed resistor 40.

As in the case of the gauge A, the output leads 41 and 42 from the gauge B may be connected to a galvanometer, oscillograph or other form of instrumentation for indicating, measuring, or recording the voltage changes in the circuit resulting from the pressure changes in the fluid transmitted to the interior of the gauge B.

As in the case of the gauge A, the temperature-compensating coil 55 is electrically connected to oppose the pressure responsive coil 52, and may be balanced by the variable resistor 39, so that temperature effects on the two coils 52 and 55 are nullified. Since the coil 55 is unaffected by deformation of the chamber 45, the output voltage of the gauge 3 is entirely responsive to the resistance of the coil 52, which is varied by deformation of the chamber 45 resulting from ambient pressure differentials.

As thus described, the gauge B exemplifies a form of the invention in which a pressure gauge of the type under consideration is provided with a compliant chamber having a generally polygonal cross-section whose perimeter is greater than a circumscribing line, each side being formed with portions depressed from the outer plane of the chamber, and the meeting edges thereof serving as means for supporting the windings of a pressure-responsive coil formed of strain-resistant wire.

Still another form of the invention is illustrated in Figs. 7 and 8. In this embodiment a pressure gauge C is formed of a pressure chamber 60, adapted to support on its outer surfaces a pressure-responsive coil 61 and a temperature-compensating coil 62.

The chamber 60 is generally an open-ended cylinder in shape formed by means of an inner shell 63 and an outer shell 64 radially spaced from each other to define a hollow intervening portion 65. The peripheral edges of the shells 63 and 64 are contiguous and are bonded together as by welding or brazing to form sealed upper and lower edges 66. One pair of axial edges of the shells 63 and 64 are bent inwardly and brazed to an axial slot 68 in a tubular element 69 to form a conduit or manifold communicating with the interior portion 65 through an open end 70 of the tube 69. The lower end of the tube 69 is closed by any suitable means.

The other axial edges of the shells 63 and 64 are butted against and brazed or otherwise bonded to the opposing edges to form the cylindrical chamber 60.

The inner and outer shells 63 and 64 are provided with a series of mating axial flutes 71 comprising concave elements 72 joined by the outwardly disposed edges 73.

As thus described, the pressure chamber 60 is exemplified as a generally cylindrical double-walled vessel forming a pressure-tight compartment into which fluid under pressure may be admitted through the open end 70 of the tubular element 69. By reason of the flutes 71, the pressures to which the chamber is subjected will tend to substantially vary its perimetrical dimensions.

The pressure-responsive coil 61 comprises a number of turns of strain-sensitive wire wound around the chamber 60 and supported upon the edges 73 of the outer shell 64. The windings are axially spaced from each other and the extremities of the coil are secured to the outer surface of the shell 63, terminating in the leads 74 and 75. The temperature-compensating coil 62 consists of a grid of the equivalent wire as that used in forming the coil 61, and of approximately the same length, secured to the outer surface of the shell 63 as by cementing and with its major convolutions disposed in an axial direction thereof.

From this description, it will be apparent that variations in the perimetrical dimensions of the chamber 60 will vary the strain induced in the coil 61 without influencing the wire of the coil 62. At the same time, variations in the resistance of the two coils due to ambient temperature conditions will be approximately equal.

One end of the coil 62 is connected to the lead 74 of the coil 61 from which a tap 76 is led out from the gauge C, and the other end forms a lead 77.

When the gauge C is connected as illustrated in Fig. 4, the input voltage is connected through the connectors 37 and 38 to the leads 75 and 77 of the gauge C. The output is taken from the tap 76 and the lead 42, the latter being connected to the circuit between the variable resistor 39 and the fixed resistor 40, and is utilized in connection with any desired form of instrumentation as heretofore described. The operation of the gauge C as thus connected is identical to that of the pressure gauge in the forms indicated at A and B.

From the foregoing description, it will be seen that the pressure gauge forming the subject matter of this invention is characterized as comprising a pressure chamber adapted to be subjected to differential fluid pressures having a cross-sectional perimeter greater than a line circumscribing the chamber in the plane of the cross-section and a coil formed of strain-sensitive wire supported on and circumscribing the chamber in the general plane of the cross-section. By this means, a simple, compact, and efficient pressure gauge is provided which is capable of having a high natural frequency.

While three specific embodiments of the present invention have been described and shown herein it is to be understood that there are many modifications that may be employed without departing from its scope. For example, whereas the temperature-compensating coil 32 of the pressure gauge A is shown (Figs. 1-3) and described as being supported continuously on a circular section of the inner shell 22, it may be desirable to extend the longitudinal corrugations or flutes 28 substantially over the length of the inner shell 22, supporting the temperature compensating coil 32 as well as the pressure indicating coil 31 on the outwardly projecting edges thus formed, or a separate series of axially extending corrugations or flutes may be formed in the upper portion of shell 22 to support the temperature-compensating coil 32.

Having thus described my invention, what I claim as new and desire to secure by Letters Patent is:

1. A pressure gauge comprising a compliant chamber responsive to differential internal and external fluid pressures, having a greater perimeter in cross-section than a line circumscribing said chamber in the plane of said cross-section, and a strain-responsive element supported on and circumscribing at least a portion of said chamber.

2. A pressure gauge comprising a compliant chamber responsive to differential internal and external fluid pressures, having a greater perimeter in cross-section than a line circumscribing said chamber in the plane of said cross-section, and a strain responsive element supported on said chamber to resist expansion thereof in the plane of said cross-section in the general plane of said cross-section.

3. A pressure gauge comprising a compliant chamber responsive to differential internal and external fluid pressures, having a greater perimeter in cross section than a line circumscribing said chamber in the plane of said cross-section, and a strain-responsive resistance wire wound around said chamber to resist expansion thereof in the plane of said cross-section.

4. A differential pressure gauge comprising a hollow, elongated fluid chamber having an axial portion of the wall thereof depressed from the external plane of said chamber and a strain-responsive resistance wire wound on and circumscribing said chamber across said depressed portion.

5. A differential pressure gauge comprising an elongated thin-walled fluid chamber having a non-circular cross-section defined by a plurality of inwardly directed depressed portions joined by contiguous outwardly extending projections, and a strain responsive element circumscribing said chamber supported on at least two of said projections.

6. A differential pressure gauge comprising a closed, tubular fluid chamber having an axial portion of reduced wall thickness and a cross-section defined by a plurality of inwardly directed depressions joined by contiguous outwardly extending projections, and a strain-responsive resistance wire wound around said axial portion and supported on said projections.

7. A differential pressure gauge comprising an elongated thin-walled fluid chamber of polygonal cross-section each side thereof having an inwardly directed depressed portion, and a strain-responsive resistance wire wound around said chamber and supported on the projecting edges of said polygonal portion.

8. A differential pressure gauge comprising an elongated thin-walled fluid chamber of quadrilateral cross-section each side thereof having an inwardly directed depressed portion, and a strain-responsive resistance wire wound around said chamber and supported on the projecting edges of said quadrilateral portion.

9. A differential pressure gauge comprising an elongated thin-walled fluid chamber of polygonal cross-section each side thereof having an inwardly directed depressed portion, a strain-responsive resistance wire wound around said chamber and supported on the projecting edges of said polygon, and a temperature-compensating coil connected in series with said resistance wire comprising a plurality of series-connected coils supported on said chamber in said depressed portions and having axially directed convolutions.

10. A differential pressure gauge comprising an elongated, tubular fluid chamber formed of a pair of concentric, radially spaced walls having cross-sections defined by a plurality of inwardly directed depressed portions joined by contiguous outwardly projecting edges, and a strain-responsive resistance wire wound around said chamber and supported on said projections.

11. A differential pressure gauge comprising an elongated, tubular fluid chamber formed of a pair of concentric, radially spaced walls having cross-sections defined by a plurality of inwardly directed depressed portions joined by contiguous outwardly projecting edges, a strain-responsive resistance wire wound around said chamber and supported on said projections, and a temperature-compensating coil supported on said chamber connected in series with said resistance wire and having axially directed convolutions secured to said depressed portions.

References Cited in the file of this patent

UNITED STATES PATENTS

| | | |
|---|---|---|
| 2,360,886 | Osterberg | Oct. 24, 1944 |
| 2,365,015 | Simmons | Dec. 12, 1944 |
| 2,420,148 | Ostergren | May 6, 1947 |
| 2,474,146 | Hathaway | June 21, 1949 |
| 2,544,567 | Rundell | Mar. 6, 1951 |
| 2,566,326 | Guillemin | Sept. 4, 1951 |